United States Patent [19]

Takemura

[11] Patent Number: 5,157,472
[45] Date of Patent: Oct. 20, 1992

[54] SEMICONDUCTOR ACCELERATION SENSOR

[75] Inventor: Seiji Takemura, Itami, Japan

[73] Assignee: Mitsubishi Denki Kabushiki Kaisha, Itami, Japan

[21] Appl. No.: 655,743

[22] Filed: Feb. 15, 1991

[30] Foreign Application Priority Data

Nov. 21, 1990 [JP] Japan ................... 2-314258

[51] Int. Cl.⁵ .............. H01L 29/84; H01L 27/22; G01B 11/20; G01L 1/00
[52] U.S. Cl. ............................. 357/26; 357/27; 73/777; 73/778
[58] Field of Search ............. 357/26, 27; 73/760, 73/777, 778

[56] References Cited

FOREIGN PATENT DOCUMENTS 0081477 3/1990 Japan ..................... 357/26

OTHER PUBLICATIONS

Nass, "Tiny Accelerometer IC Reaches High Sensitivity", Electronic Design, Sep. 1988.

*Primary Examiner*—Andrew J. James
*Assistant Examiner*—Carl Whitehead, Jr.
*Attorney, Agent, or Firm*—Leydig, Voit & Mayer

[57] ABSTRACT

A semiconductor acceleration sensor and a method of producing the sensor are characterized in that a pedestal on which a semiconductor acceleration sensor chip including a weight is mounted is integral with a stopper for preventing movement of the weight outside a prescribed range. The semiconductor acceleration sensor is not broken even if an acceleration outside the measurement range is applied. In addition, the semiconductor acceleration sensor exhibits high accuracy and is low in cost.

2 Claims, 4 Drawing Sheets

SEMICONDUCTOR ACCELERATION SENSOR

BACKGROUND OF THE INVENTION

The present invention relates to a semiconductor acceleration sensor and a method of producing the sensor, and particularly to a semiconductor acceleration sensor comprising a pedestal on which a semiconductor acceleration sensor chip is mounted and a stopper for stopping unnecessary movement of a weight, both of which are integrally formed, and a method of producing the sensor.

FIG. 5 is a sectional side view taken along the center line of a conventional semiconductor acceleration sensor in the lengthwise direction thereof, and FIG. 6 is a plan view of the same. In the drawings, a sensor chip 1 provided with a weight 9 for detecting acceleration is cantilevered from a pedestal 11 which is fixed to a base 5. The base 5 is mounted on a package 4.

As shown in FIGS. 7 and 8, an etched portion 3 is formed in the sensor chip 1 for the purpose of detecting acceleration as a distortion of the chip, and the rear side of the etched portion 3 is provided with a piezoresistance portion 2 which outputs acceleration as a change in resistance. Wiring from the piezoresistance portion 2 is connected to each internal lead 6 through a metal fine wire 12 and to an external circuit (not shown) through external leads 8 which continue from each internal lead 6. Each of the internal leads 6 is insulated from the base 5 by an insulating material such as glass 7. Each of the members such as the base 5, the sensor chip 1 and so on is covered with a cap 10 hermetically sealing the package.

The conventional semiconductor acceleration sensor configured as described above is formed by mounting the acceleration sensor chip 1 on the pedestal 11 by using an adhesive material (not shown) such as a gold-silicon alloy or the like and then mounting the pedestal 11 on the base 5 by using the same adhesive material. The internal leads 6 provided on a package 4 are then connected to an electrode (not shown) for extracting as output distortion in the sensor chip 1 using the metal fine wires 12. The weight is then mounted at an end of the sensor chip 1 by using an adhesive material (not shown), and the cap 10 is then welded to a flange portion 4a provided on the outer periphery of the base 5 of the package 4. The thus-assembled semiconductor acceleration sensor has the structure shown in FIG. 5 in which the metal fine wires 12 are provided on the upper surface of the weight 9 at a distance from the cap 10 so that they do not contact the cap 10.

In the above-described semiconductor acceleration sensor, when acceleration of a degree which is higher than the breaking strength of the residual portion of the etched portion 3 is applied to the sensor chip 1, the sensor chip 1 is broken in some cases. Namely, the thickness of the residual portion of the etched portion 3 of the sensor chip 1 is determined by the measurement range of acceleration in balance with the position and weight of the weight so that the sensor chip is not broken during use within that range. For example, when gravitational acceleration of 1 G is applied to the end of the sensor chip 1, bending of about 1 μm is produced, with allowance of about 400 μm. However, the conventional sensor has the problem that, when acceleration or impact outside the measurement range is applied to the semiconductor acceleration sensor by falling or the like during conveyance, the etched portion of the sensor chip 1 is broken due to the cantilever structure.

The conventional sensor also has the problem that, since the sensor chip 1, the pedestal 11 and the base 5 are bonded to each other using an adhesive material because extremely small flexure is measured, the working accuracy deteriorates, and thus the measurement accuracy of the acceleration sensor is adversely effected.

SUMMARY OF THE INVENTION

The present invention has been achieved with a view to solving the foregoing problems. It is an object of the present invention to provide an inexpensive semiconductor acceleration sensor with high accuracy which is not broken even if acceleration outside the measurement range is applied and a method of producing the sensor.

To this end, the present invention provides a semiconductor acceleration sensor comprising a semiconductor acceleration sensor chip provided with a weight at an end thereof, a base on which the semiconductor acceleration sensor chip is mounted, a pedestal through which the semiconductor acceleration sensor chip is mounted on the base, a stopper for preventing movement of the weight outside a prescribed range, and a cap provided on the base covering the semiconductor acceleration chip on the base, the weight and the stopper, wherein the pedestal and the stopper are integrally formed.

The present invention also provides a method of producing the semiconductor acceleration sensor comprising the steps of providing a weight on a semiconductor acceleration sensor chip, integrally forming a stopper for preventing movement of the weight outside a prescribed range and a pedestal on which the semiconductor acceleration sensor chip is mounted, mounting the semiconductor acceleration sensor chip on the pedestal portion of the stopper, mounting the stopper on a base which forms a package and providing a cap the semiconductor acceleration sensor chip on the base, the weight, and the stopper and so on.

DESCRIPTION OF PREFERRED EMBODIMENTS

Figure 1:
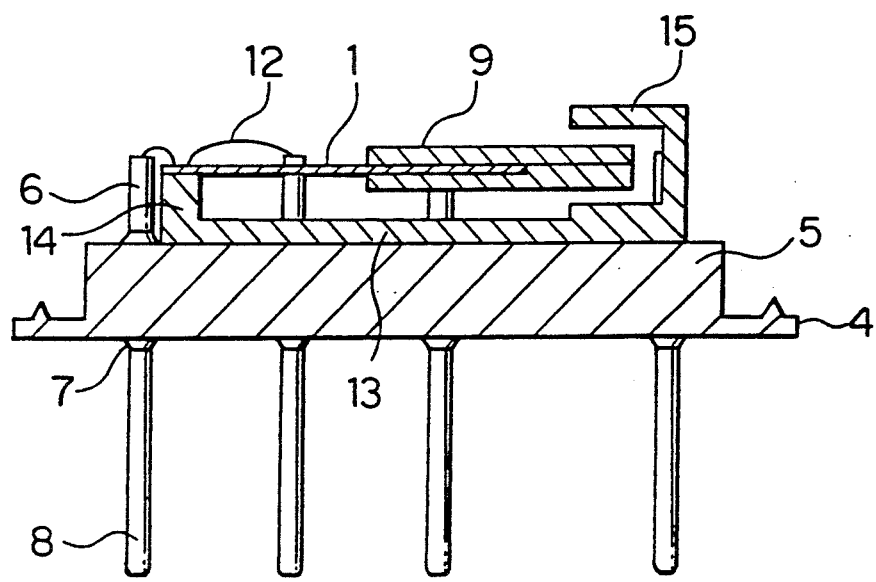
FIG. 1 is a sectional side view of a semiconductor acceleration sensor in accordance with an embodiment of the present invention.
Figure 2:
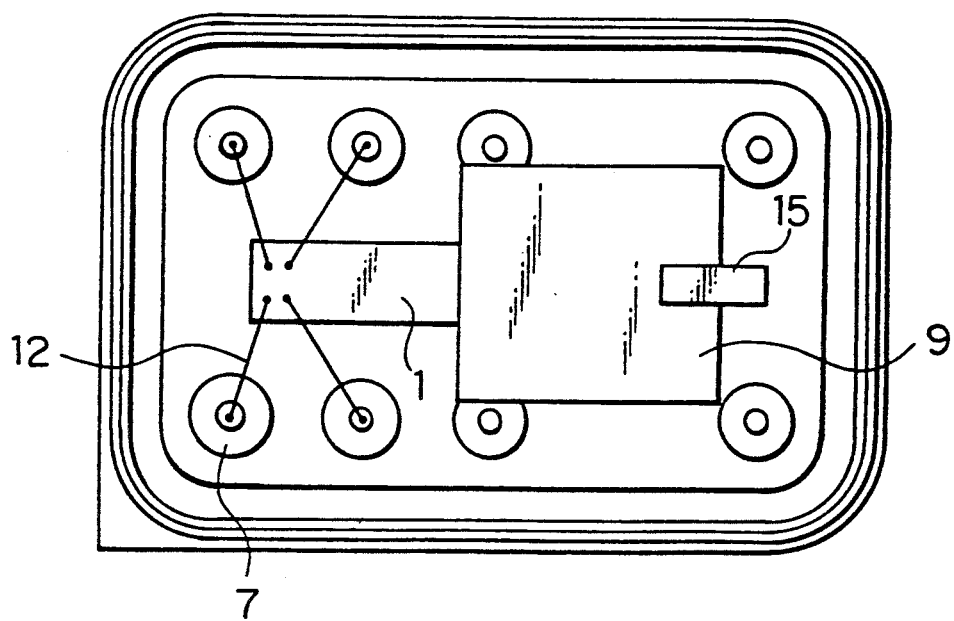
FIG. 2 is a plan view of the semiconductor acceleration sensor shown in FIG. 1.
Figure 3:
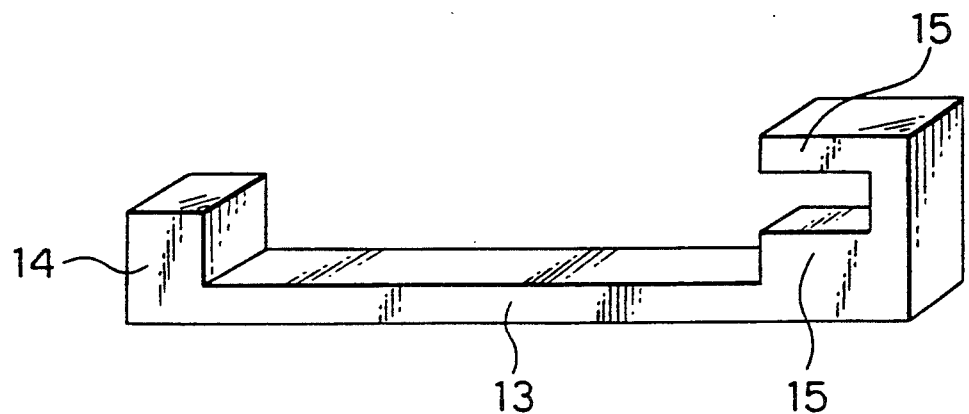
FIG. 3 is a perspective view of a stopper.

FIG. 1 is a sectional side view taken along the center line in the lengthwise direction of a semiconductor acceleration sensor in accordance with an embodiment of the present invention, and FIG. 2 is a plan view of the sensor. In the drawings, reference numerals 1 to 4, 6 to 10 and 12 denote the same as those of the above-described conventional semiconductor acceleration sensor. However, the cap 10 is not shown in FIGS. 1 and 2. The present invention uses a stopper 13 which is formed integrally with the pedestal and which comprises a portion 14 corresponding the pedestal and a stopper portion 15. FIG. 3 is a perspective view of the stopper 13.

In the semiconductor acceleration sensor configured as described above, the distance (movable range of the weight 9) between the stopper portion 15 of the stopper 13 and the weight 9 is mode smaller than the distance at which sensor chip breaks, displacement at which the sensor chip breaks, a displacement chip 1. Even if acceleration outside the measurement range is applied to the semiconductor acceleration sensor in the direction of application of acceleration or the reverse direction, the movement of the weight 9 is inhibited by the stopper 13 so that the sensor chip 1 is not broken. In addition, since the pedestal and the stopper are united, the process of combining the two members is omitted. This causes a decrease in the number of processes and the prevention of the occurrence of dimensional deviation during connection between the pedestal and the stopper. The semiconductor acceleration sensor can be thus produced with high accuracy. An attempt can be also made to reducing the production cost by reducing the number of assembly processes. The stopper 13 is preferably produced by metal injection molding method because a complicated shape can be obtained in that process with high accuracy.

Figure 4:
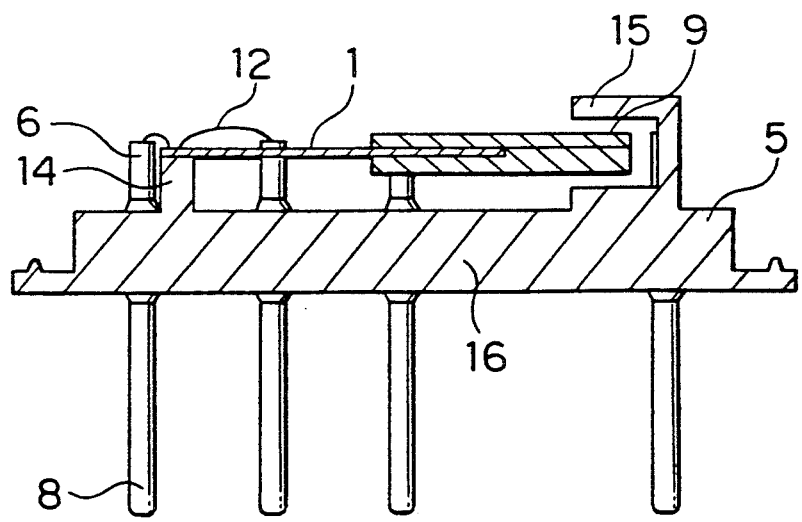
FIG. 4 is a sectional side view of a semiconductor acceleration sensor in accordance with another embodiment of the present invention.
Figure 5:
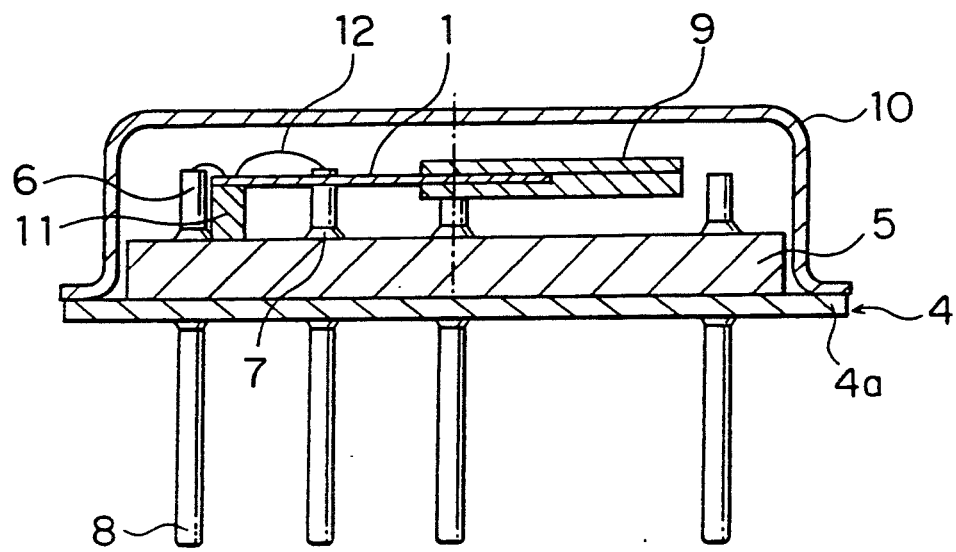
FIG. 5 is a sectional side view of a conventional semiconductor acceleration sensor.
Figure 6:
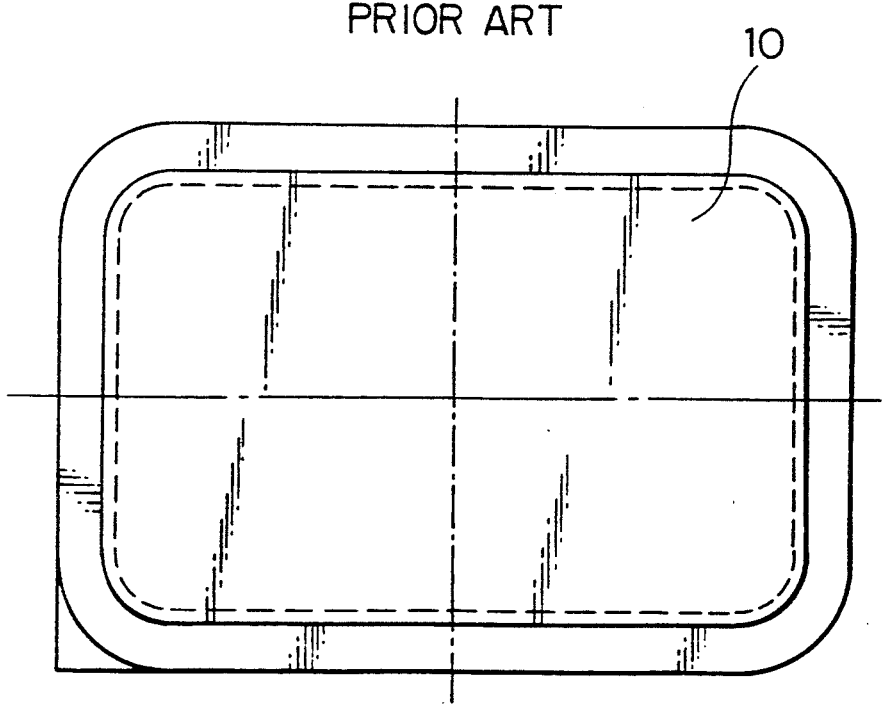
FIG. 6 is a plan view of the semiconductor acceleration sensor shown in FIG. 5.
Figure 7:
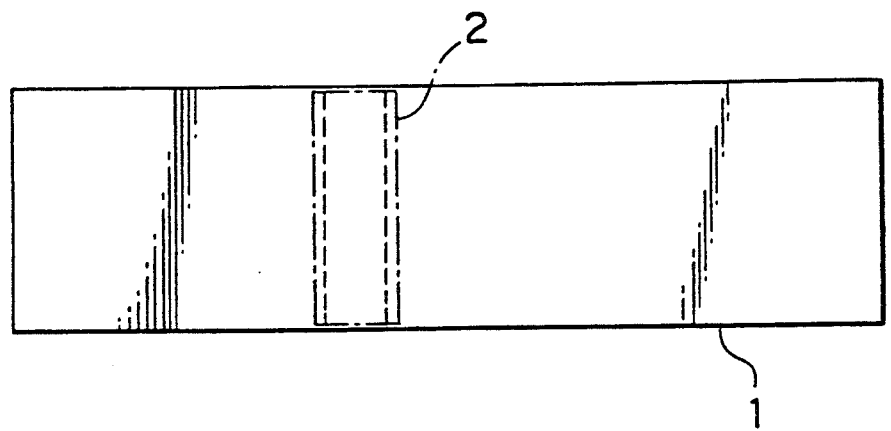
FIGS. 7 and 8 are a plan view and a side view, respectively, of a semiconductor acceleration sensor chip.
Figure 8:
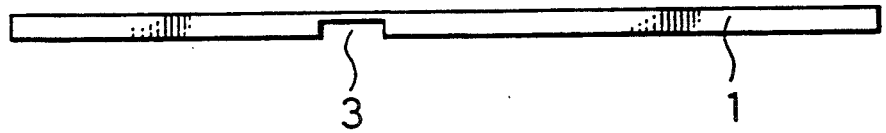

Although the above embodiment comprises the stopper 13 provided integrally with the pedestal, a stopper may be provided integrally with the base 16 of the package so that the number of production processes can be further reduced, as shown in FIG. 4. In this case, although the base 16 has a complicated shape, it is preferably be produced by a metal injection molding method with high precision at low cost.

What is claimed is:

1. A semiconductor acceleration sensor comprising:
   a semiconductor acceleration sensor chip including a mounting end and a cantilevered end;
   a weight attached to said cantilevered end for movement in response to acceleration of said sensor;
   a metal base;
   a unitary metal stopper mounted on said metal base and including a pedestal on which the mounting end of said semiconductor acceleration sensor chip is mounted and a stopper portion proximate said weight for preventing movement of said weight outside a prescribed range; and
   a cap mounted on said base covering said semiconductor acceleration sensor chip, said weight, and said stopper.

2. A semiconductor acceleration sensor comprising:
   a semiconductor acceleration sensor chip including a mounting end and a cantilevered end;
   a weight attached to said cantilevered end for movement in response to acceleration of said sensor;
   a unitary metal base including a metal stopper having a pedestal on which the mounting end of said semiconductor acceleration sensor chip is mounted and a stopper portion proximate said weight for preventing movement of said weight outside a prescribed range; and
   a cap mounted on said base covering said semiconductor acceleration sensor chip, said weight, and said stopper.

* * * * *